United States Patent
Stapelmann

(10) Patent No.: US 10,669,982 B2
(45) Date of Patent: Jun. 2, 2020

(54) WAVE ENERGY CONVERTER WITH A DEPTH ADJUSTABLE PARAVANE

(71) Applicant: Frank Herbert Stapelmann, Santa Barbara, CA (US)

(72) Inventor: Frank Herbert Stapelmann, Santa Barbara, CA (US)

(73) Assignee: Bardex Corporation, Goleta, CA (US)

( * ) Notice: Subject to any disclaimer, the term of this patent is extended or adjusted under 35 U.S.C. 154(b) by 24 days.

(21) Appl. No.: 15/663,353

(22) Filed: Jul. 28, 2017

(65) Prior Publication Data

US 2018/0030953 A1    Feb. 1, 2018

Related U.S. Application Data

(60) Provisional application No. 62/368,040, filed on Jul. 28, 2016.

(51) Int. Cl.
*F03B 13/18* (2006.01)

(52) U.S. Cl.
CPC .......... *F03B 13/182* (2013.01); *F03B 13/189* (2013.01); *F05B 2240/30* (2013.01); *F05B 2240/9151* (2013.01); *F05B 2240/95* (2013.01); *F05B 2240/97* (2013.01); *F05B 2260/406* (2013.01); *Y02E 10/38* (2013.01)

(58) Field of Classification Search
CPC ........ F03B 13/1855; F03B 13/18–1895; F03B 13/187; F03B 13/1875; F03B 13/1845; F03B 13/1865; F03B 13/14; F03B 13/16; F03B 13/1805; F03B 13/181; F03B 13/1815; F03B 13/182; F03B 13/1885; F03B 13/189; F03B 13/1895; F05B 2240/9151; F05B 2250/11; Y02E 10/38
See application file for complete search history.

(56) References Cited

U.S. PATENT DOCUMENTS 1,021,572 A * 3/1912 Bryson ............... F03B 13/1815
60/505
4,208,875 A * 6/1980 Tsubota ................ F03B 13/184
417/331

(Continued)

FOREIGN PATENT DOCUMENTS

EP          3011166 A1   4/2016
WO     2014202082 A1   12/2014

OTHER PUBLICATIONS

Berg, Jonathan C.; "Extreme Ocean Wave Conditions for Northern California Wave Energy Conversion Device", Sandia Report, SAND2011-9304, Dec. 2011, Sandia National Laboratories, Albuquerque, New Mexico and Livermore, California [19 pages].

(Continued)

*Primary Examiner* — Mark A Laurenzi
*Assistant Examiner* — Xiaoting Hu
(74) *Attorney, Agent, or Firm* — Michael S. McCoy; Amatong McCoy LLC

(57) ABSTRACT

A wave energy converter is provided. The wave energy converter includes a paravane rotationally and pivotably coupled to a support structure, and operatively coupled to an energy collection device. A method of harvesting water wave energy is provided. The method includes positioning the paravane within water to be impacted by water waves, and transferring water wave energy from the paravane to the energy collection device.

30 Claims, 7 Drawing Sheets

(56) References Cited

U.S. PATENT DOCUMENTS

| | | | | |
|---|---|---|---|---|
| 4,453,894 A | * | 6/1984 | Ferone | F03B 13/181 417/332 |
| 6,305,308 B1 | | 10/2001 | Kristiansen et al. | |
| 8,308,449 B2 | * | 11/2012 | Smith | F03B 13/187 137/243 |
| 2004/0201223 A1 | | 10/2004 | Grinsted et al. | |
| 2005/0167988 A1 | * | 8/2005 | Wood | F03B 13/187 290/53 |
| 2006/0208839 A1 | * | 9/2006 | Taylor | F03B 13/1895 335/205 |
| 2008/0238102 A1 | | 10/2008 | Wegener et al. | |
| 2009/0309366 A1 | * | 12/2009 | Moore | B63B 35/44 290/53 |
| 2010/0190394 A1 | * | 7/2010 | Hine | B63B 21/66 441/11 |
| 2011/0018275 A1 | | 1/2011 | Sidenmark | |
| 2011/0036085 A1 | | 2/2011 | Oigarden | |
| 2012/0247096 A1 | * | 10/2012 | Gerber | F03B 13/1855 60/496 |
| 2013/0341927 A1 | | 12/2013 | Murphree | |
| 2015/0069761 A1 | * | 3/2015 | Heim | F03B 13/1815 290/53 |
| 2015/0292471 A1 | * | 10/2015 | Kithil | F03B 13/187 60/497 |
| 2016/0061179 A1 | | 3/2016 | Pechlivanides | |
| 2017/0152672 A1 | * | 6/2017 | Santucci | F03D 13/22 |

OTHER PUBLICATIONS

Hansen, Rico Hjerm; "Design and Control of the Power Take-Off System for a Wave Energy Converter with Multiple Absorbers", Department of Energy Technology, Oct. 2013, Aalborg University, Denmark [291 pages].

Jacobson, P.; "Mapping and Assessment of the United States Ocean Wave Energy Resource", 2011 Technical Report, Dec. 2011, Electric Power Research Institute, Palo Alto, California [176 pages].

Notification of Transmittal of International Search Report and Written Opinion dated Dec. 12, 2017 (issued in PCT Application No. PCT/US2017/044477) [17 pages].

Notification of Transmittal of International Preliminary Report on Patentability dated Jul. 20, 2018, during the prosecution of International Application No. PCT/US2017/044477. [29 pages].

Supplementary EP Search Report issued in EP Application No. 17835368.6 dated Nov. 25, 2019 [7 Pages].

* cited by examiner

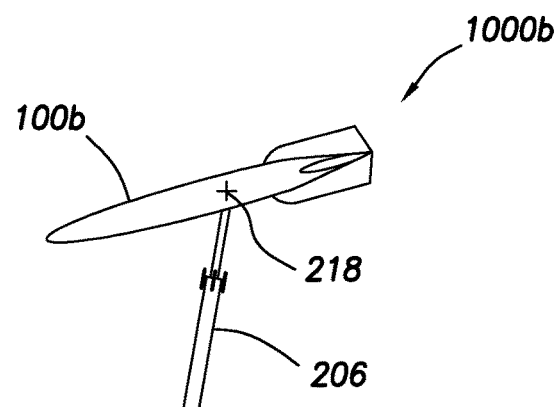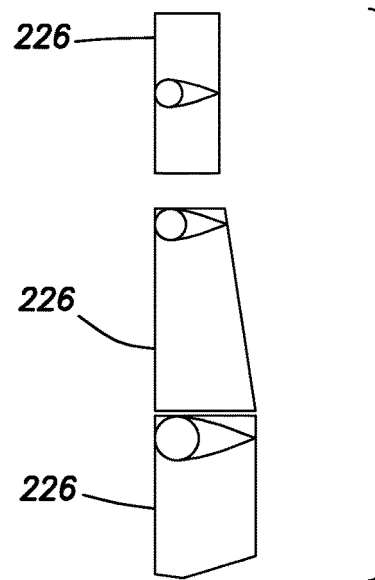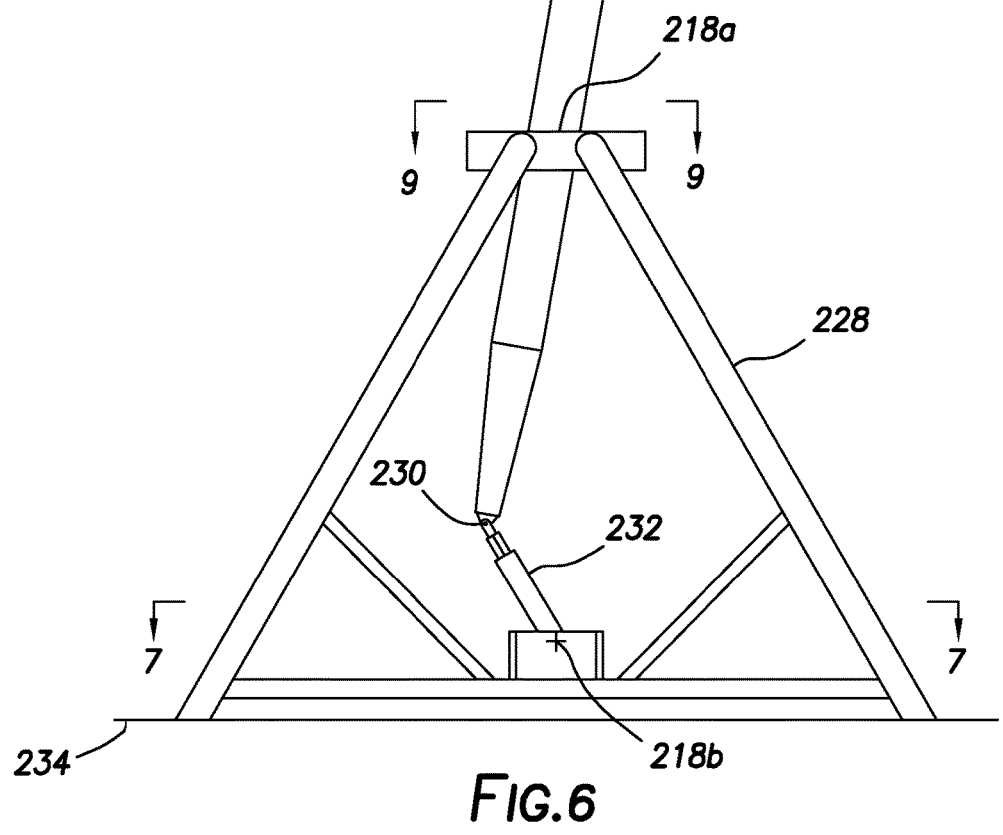
FIG.5
FIG.6

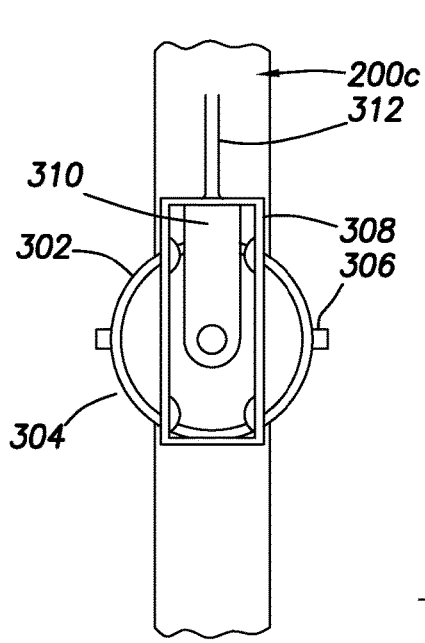
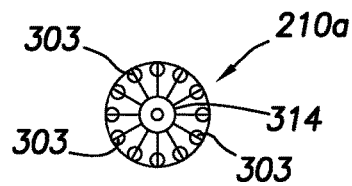
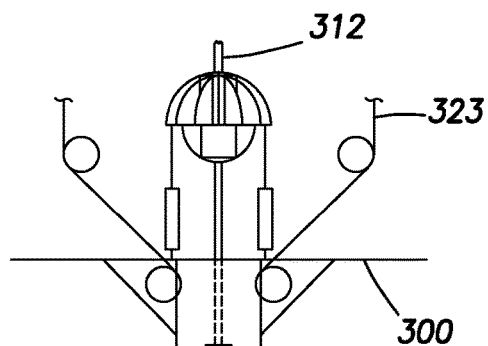
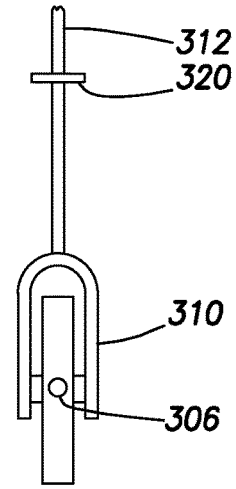
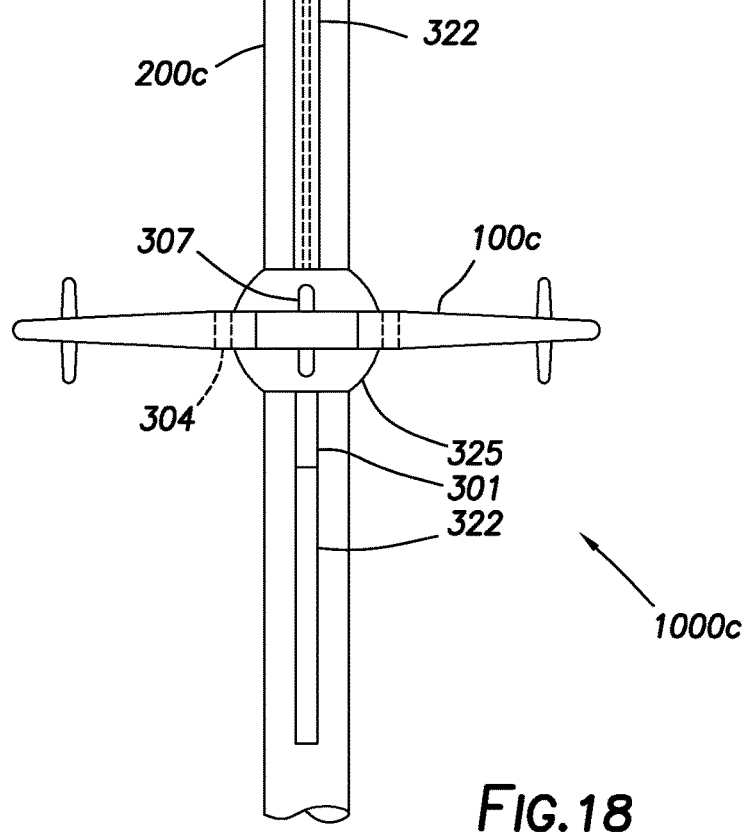
FIG. 15
FIG. 16
FIG. 17
FIG. 18

WAVE ENERGY CONVERTER WITH A DEPTH ADJUSTABLE PARAVANE

CROSS-REFERENCE TO RELATED APPLICATIONS

The present application claims the benefit of U.S. Provisional Patent Application No. 62/368,040, filed on Jul. 28, 2016, the entirety of which is incorporated herein by reference.

FIELD

The present disclosure relates to wave energy converters, and to methods of harvesting, converting, storing, using, and/or transferring energy from water waves.

BACKGROUND

Wave energy conversion involves the use of a wave energy converter (WEC) in the harvesting, transfer, conversion, storage, use, or combinations thereof of water wave energy (e.g., ocean waves), such as to produce electricity.

One concern in WECs is the ability to operate under conditions in which wave energy levels may exceed the WECs capacity, also referred to as survivability. For example, the mechanical interface and power take off (PTO) of a particular WEC may be designed for a particular operating range of conditions (e.g., wave frequency, force, and height). Conventionally, when a WEC approaches, reaches, and/or exceeds such maximum operating conditions (MOC), the WEC is shutdown and placed into a "survival mode," thus ceasing to capture wave energy. The ability of a WEC to operate regardless of wave conditions may allow wave energy to be harvested in a continuous, uninterrupted manner, even during high-energy events, thus allowing continued capture of wave energy. Adjustability of a paravane would allow the paravane to be positioned closer to the surface, allowing for greater wave energy collection during small, low-energy wave events.

Conventional WECs do not account for the fact that ocean near-shore currents may be approximately 90° relative to prevailing wave trains. Near-shore ocean currents may vary in direction and strength due to tidal influences, local weather, and seasonal climatic conditions. The ability of a WEC to vary operational direction with local current directions may allow wave energy to be harvested regardless of current direction.

Also, conventionally, buoy or positive buoyant WECs react only to heave up forces. A neutral buoyant paravane would allow reaction to both heave up and down forces, providing the potential for a doubling of the efficiency of the paravane in collection of wave energy relative to a WEC that only reacts to heave up forces.

BRIEF SUMMARY

An embodiment of the present disclosure provides for a wave energy converter. The wave energy converter includes a support structure. A paravane is rotationally and pivotably coupled to the support structure. An energy collection device is operatively coupled to the paravane.

Another embodiment of the present disclosure provides for method of harvesting water wave energy. The method includes positioning a paravane, coupled to a support structure, within water to be impacted by water waves, and transferring water wave energy from the paravane to an energy collection device.

In some embodiments, the paravane functions as an absorption plate or mechanical interface to the wave energy. In some such embodiments, greater plan shape areas for the paravane will allow the paravane to absorb greater amounts of energy.

The foregoing has outlined rather broadly the features and technical advantages of the present disclosure in order that the detailed description that follows may be better understood. Additional features and advantages will be described hereinafter, which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure. The novel features which are believed to be characteristic of the products, systems, and methods, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that the manner in which the features and advantages of the system, products, and/or method so of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 5 depicts fairings suitable for use with at least some embodiments of the wave energy converter disclosed herein.

FIG. 6 is a side view of a wave energy converter including a depth adjustable paravane installed on a surge-sway tower.

FIG. 15 is a detail view showing a rolling ring axle, pitch wheel, and pitch wheel bearing chase and carriage frame of the wave energy converter of FIG. 18.

FIG. 16 is a detail view of energy collection device cylinders and an actuator rod locking collet of the wave energy converter of FIG. 18.

FIG. 17 is a detail view of showing a pitch wheel yoke of the wave energy converter of FIG. 18.

FIG. 18 is a partial cut-away, bow elevation view of a wave energy converter including a depth adjustable paravane installed on a spar in accordance with certain embodiments.

Figure 1:
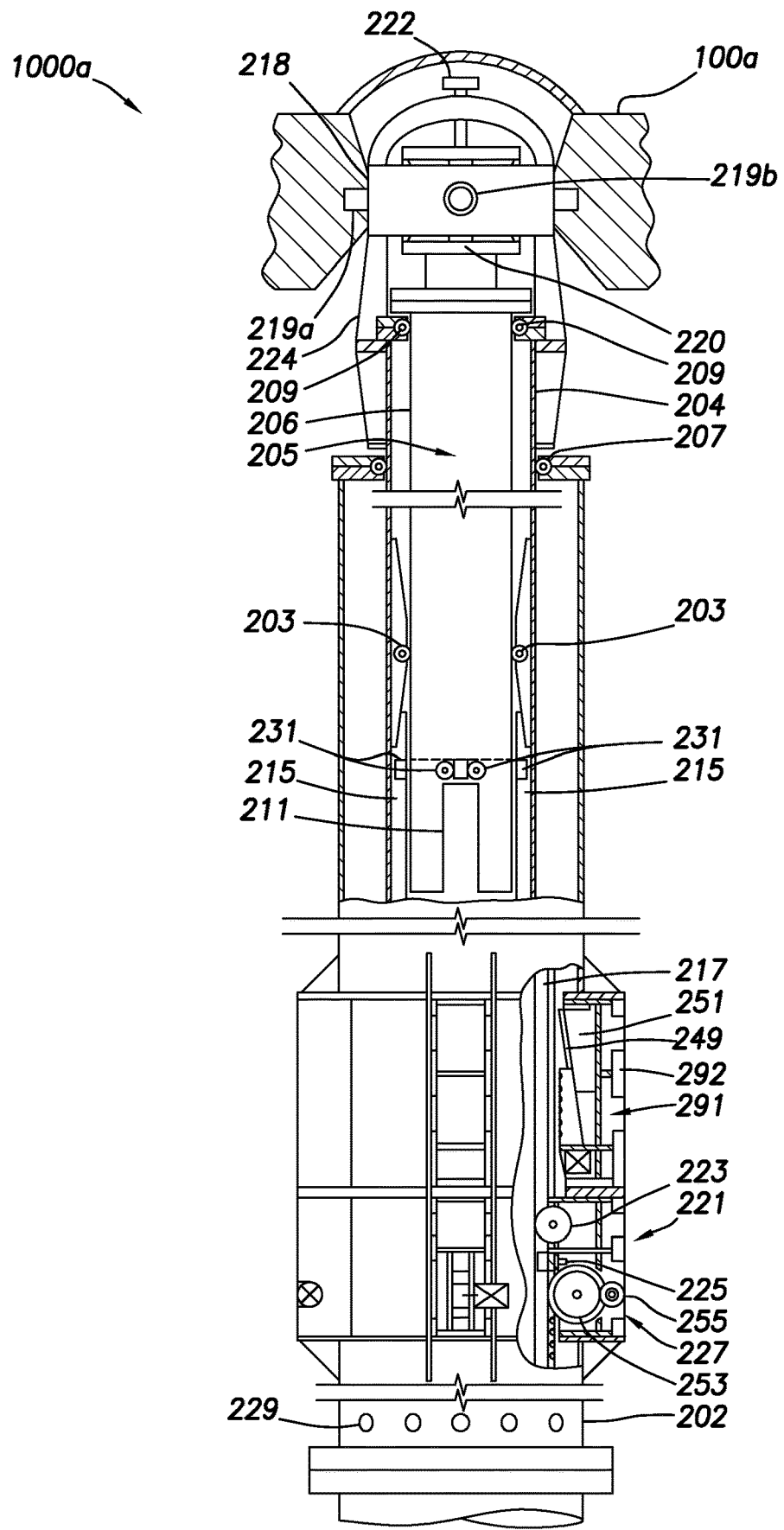
FIG. 1 is a partial cut-away, side view of a wave energy converter including a depth adjustable paravane installed on a structural column with the stroke and operating range telescopes retracted.

Products and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include a wave energy converter. The wave energy converter is configured to harvest water wave energy (e.g., ocean waves). For example and without limitation, the wave energy converter may store energy from water waves as hydraulic energy (e.g., pressurized hydraulic fluid), pneumatic energy (e.g., pressurized gas), or electrical energy (e.g., battery stored electricity). The stored energy may then be transferred and/or used to perform work. The wave energy converter disclosed herein is not limited to storage in these mediums, and may be configured to store energy in any manner and form known to those skilled in the art. The stored energy may be transferred from a local environment proximate the wave energy converter to a remote environment at a distance from the wave energy converter, such as transfer of energy from an offshore wave energy converter to onshore for use thereof. In some embodiments, energy harvested by the wave energy converter is not stored, and is transferred and/or used to perform work without intermediate storage. The energy harvested by the wave energy converter may be used to provide power in the local environment, such as providing power to an offshore floating vessel; providing power to a remove environment, such as inputting electrical energy into an onshore electric grid for residential, commercial, and/or industrial use; or combinations thereof. Certain embodiments relate to an array of multiple wave energy converters disclosed herein for harvesting water wave energy.

The wave energy converter includes a paravane (also referred to as a "fish" or "biomimicry fish") that is rotationally and pivotably coupled to a support structure such that the paravane is capable of moving relative to the support structure in response to water waves impacting the paravane. While exemplary embodiments of rotational and pivotable coupling of the paravane to the support structure are shown and described herein, such rotational and pivotable coupling is not limited to the embodiments shown in the Figures, and may be achieved in any manner known to those skilled in the art.

The paravane may be a depth adjustable paravane. As used herein, "depth adjustable paravane" refers to a paravane in which a depth of the paravane, relative to the seabed and to the mean sea level is adjustable, allowing the paravane to be selectively maintained at a desired depth. In some embodiments, the depth of the paravane may be adjusted "on the fly" in response to, for example and without limitation, changes in the mean sea level, changes in the force of impact imparted from the waves to the paravane, and/or changes in the desired level of energy to be harvested from the water waves. While exemplary embodiments of depth adjustment of the paravane are shown and described herein, such depth adjustment is not limited to the embodiments shown in the Figures, and may be achieved in any manner known to those skilled in the art.

The wave energy converter includes an energy collection device operatively coupled to the paravane. In operation, movement of the paravane in response to water waves impacting the paravane is transferred (e.g., mechanically) from the paravane into the energy collection device for storage therein. While exemplary embodiments of energy collection devices are shown and described herein, such energy collection devices are not limited to the embodiments shown in the Figures, and may be any energy collection device known to those skilled in the art.

With reference to the Figures, embodiments of the wave energy converter will now be described. However, it is understood by those skilled in the art that the wave energy converter disclosed herein is not limited to the particular embodiments shown and described with reference to the Figures.

Structural Column with Telescoping Sections

FIGS. 1-4 depict wave energy converter 1000a, and portions thereof, in accordance with certain embodiments of the present disclosure. Wave energy converter 1000a includes paravane 100a rotationally and pivotably coupled to support structure 200a, and operatively coupled to energy collection device 210.

Support Structure

In the embodiment of FIGS. 1-4, support structure 200a has three sections. The first section is a static, structural column 202 or tower. The structural column 202 may be made of steel, a high-modulus composite material (e.g., resin), or any other suitable material as understood by those skilled in the art. Structural column 202 is fixed and static relative to the water wave. In a preferred embodiment, structural column 202 is fixed to the seabed (not shown). In alternative embodiments, structural column 202 may be fixed to a structure that is relatively stable relative to water wave. For example, it may be fixed to a movable or floating platform. Support structure 200a includes a second section, here shown as operating range telescope 204, which is telescopically engaged to structural column 202 and is extendable and retractable relative to structural column 202. Operating range telescope 204 is coupled to structural column 202, at least in part, via upper alignment girth rollers 207 and at a lower end by draft adjustment assemblies 221. Support structure 200a includes a third section, herein shown as stroke telescope 206, which is telescopically engaged to operating range telescope 204, and is movable relative to operating range telescope 204. Stroke telescope 206 is coupled to operating range telescope 204, at least in part, via upper alignment girth rollers 209 and lower alignment girth rollers 203.

Operating range telescope 204 moves (extends and retracts) relative to structural column 202, to define an operating range of paravane 100a. As used herein, "operating range" refers to the distance from the mean sea level to the greatest depth required for continual operation of paravane 100a, i.e., the Rated Operating Condition (ROC), which is descried in more detail below.

Also, as described in more detail below with respect to paravane 100a, stroke telescope 206 moves relative to the structural column 202 and the operating range telescope 204 in response to water wave. As shown, stroke telescope 206 and operating range telescope 204 are 1:1 ratio cantilevered pipes; however, those skilled in the art understand that other configurations of stroke telescope 206 and operating range telescope 204 are possible. Each of stroke telescope 206 and operating range telescope 204 may be made of steel, a high-modulus composite material (e.g., resin), or any other suitable material as understood by those skilled in the art.

Upper alignment girth rollers 207 and 209 may be installed on upper flanges of operating range telescope 204 and stroke telescope 206, respectively. Upper alignment girth rollers 207 and 209 may be supported by the upper flanges of the telescopes, and be bolted thereon. Upper alignment girth rollers 207 and 209 may be closely spaced and include sealed bearing and wear surfaces of a material that is softer than the mating surface of the upper flanges of the telescopes, which may include a cathodic protection paint thereon.

Lower alignment girth rollers 203 may be of a similar construction as upper alignment girth rollers 207 and 209, but installed on an interior of operating range telescope 204.

Support structure 200a includes seawater vents 229. In operation, reciprocating motion of energy collection device 210, as described in more detail below, flushes ocean water throughout the interior of portions of support structure 200a. In some embodiments, gravity swung check/flapper valves are disposed at the base of structural column 202, such that during flushing through seawater vents 229, check/flapper valves open and when not flushing, check valves close. Those skilled in the art would understand that the placement and arrangement of seawater vents 229 is not limited to the particular placement and arrangement shown.

Paravane 100a is rotationally and pivotably coupled to a top of support structure 200a. With reference to FIG. 1, paravane 100a is attached to stroke telescope 206 via gimbal joint 218. Gimbal joint 218 may be a double gimbal including spindle 220, and may be configured to provide paravane 100a with a pitch and roll and rotation relative to structural column 202. In one embodiment, the gimbal joint 218 allows for up to 40° of pitch and roll and unlimited 360° rotation about structural column 202. The ability of paravane 100a to pitch, roll, and rotate, reduces or eliminates side loading on wave energy converter 1000a, such as side loading on support structure 100. Also, the ability of paravane 100a to pitch, roll, and rotate allows paravane 100a to adjust to changes in the direction of impacting water waves, such as in dynamic water wave conditions, allowing paravane 100a to maximize reaction to heave up and heave down forces.

Gimbal joint 218 may include a cast gimbal ring with two axles, 219a and 219b. The two gimbal ring axles 219a and 219b may be captured by sealed, tapered roller bearings held by journals, port and starboard, in paravane 100a. Spindle 220, with captured dry bearings, may include two axles, with a 90° offset relative to the axels 219a and 219b. In some embodiments, installation and removal of the gimbal ring from the spindle 220 casting is possible with no spindle axle bearings in place. Spindle 220 bearing casting may be a two-part "female" bolted assembly having two axles and an "hour-glass" or "double-conical" form. In certain embodiments, the taper of the hourglass or double-conical shape of spindle 220 bearing casting is not a locking taper. Spindle 220 bearing casting may be the journal for two pairs of split-dry bearings, each of conical shape. Some embodiments of spindle 220 may include vertical thrust ring bearings. Dry bearings of spindle 220 may be sealed from the marine environment. A grease or graphite cap diaphragm may be disposed at a crown of spindle 220, allowing ocean depth pressure to purge grease or graphite in the case of any seal failures. In some embodiments, with certain mortise and tenon mating of the two casting halves of spindle 220 bearing casting, as the dry bearings wear and decrease in thickness a servicing step may include tightening the two casting halves together, thus decreasing any play in the bearing/spindle assembly.

Although not shown, gimbal joint 218 may also include dampeners, such as springs or hydraulics, to prevent the gimbal joint 218 from hitting its mechanical limits when operating in high energy, turbulent conditions. In some embodiments, correct controls, reducing depth of paravane 100a, will preclude paravane 100a from operating in conditions that would require the use of 'soft' limit stops, such as dampeners. Alternatively, the paravane 100a may include closed loop pairs of hydraulic cylinders or pumps, which, through pressure regulation and acting as brakes, operate to limit the pitch and roll. The closed loop hydraulic cylinders may also be configured to return gimbal joint 218 to a preferred orientation, such as one in which the paravane 100a is in a horizontal attitude.

With spindle 220 attached to stroke telescope 206, both spindle 220 and stroke telescope 206 are prevented from rotating in response to paravane 100a azimuth change, by guide bars 215 coupled (e.g., machine screwed) to the inside operating range telescope 204 and aligned with the centerline of operating range telescope 204. Rotation limit rollers 231 (guide bar rollers) may be coupled (e.g., machine screwed, such as if of steel construction) to the exterior of the stroke telescope 206, which engage guide bars 215 and limit rotation thereof.

Figure 2:
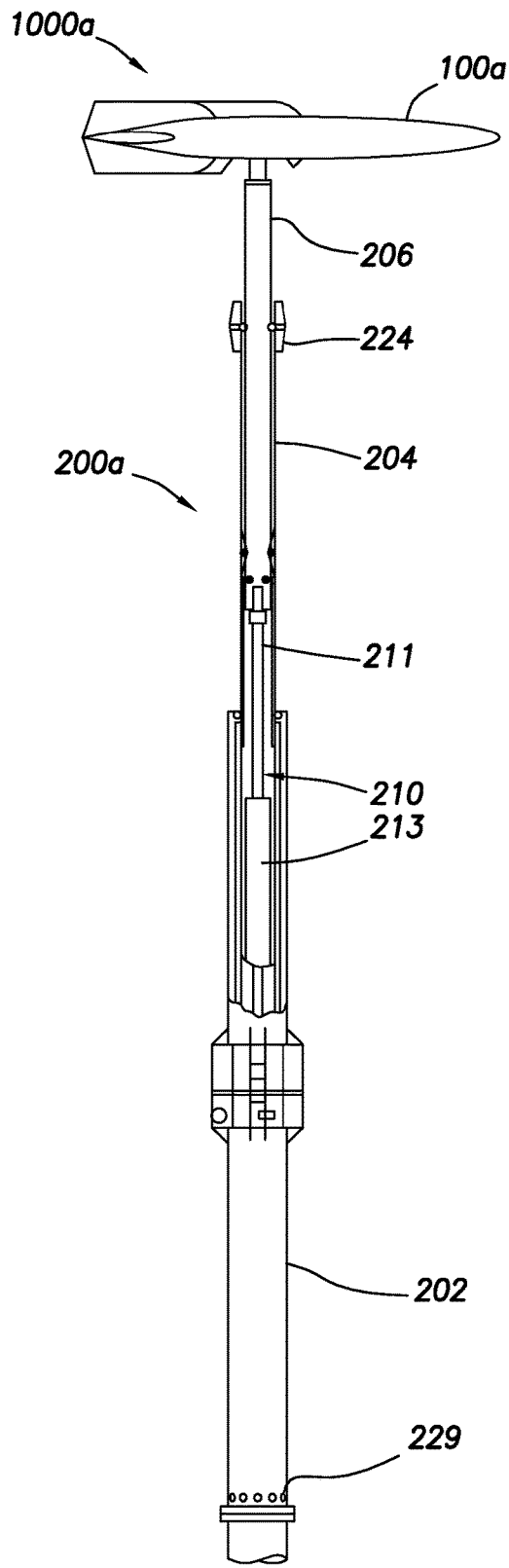
FIG. 2 is another partial cut-away, side view of the wave energy converter of FIG. 1, with the stroke and operating range telescopes extended.

Structural column 202 provides alignment, rotation, and depth control for the operating range telescope 204. In a preferred method of providing alignment, rotation, and depth control, structural column 202 of the embodiment shown in FIG. 1 includes four adjustment assemblies 221. The cutaway portion of structural column 202 in FIG. 2 shows one of the adjustment assemblies 221. The adjustment assemblies 221 are used to retract or extend operating range telescope 204, which, in turn, raises and lowers paravane 100a. Operating range telescope 204 includes guide bar/racks 217 (one of four of which is shown). The operating range telescope 204 is limited in rotation by guide bars/racks 217 for depth control. The embodiment shown includes two hydraulic controls—draft locking assemblies 291 and draft adjustment assemblies 221. Draft locking assemblies 291 and draft adjustment assemblies 221 are configured as cartridges, allowing assemblies 291 and 221 to be readily changeable, as maintenance requires.

Each draft locking assembly 291 includes paired wedge chocks 251, which are selectively engaged and disengaged via a hydraulic motor 292, such as via an acme screw powered by the hydraulic motor. The paired wedge chocks 251 may be aligned with the top surface of a dovetail track 249. The paired wedge chocks 251 use the dovetail track 249 to maintain alignment to each other.

Each draft adjustment assembly 221 includes lower alignment rollers 223, rotation limit rollers 225, and a power train 227. The power train 227 includes a hydraulic motor (not shown), a reduction gear 255, and a pinion gear 253. Rollers 223 and 225 engage the sides of guide bar/racks 217. The pinion gear 253 of power train 227 engages teeth of the guide bar/racks 217. Coordinated control between locking and adjustment assemblies 291 and 221 increases or decreases and locks the position of operating range telescope 204 depth, thereby, controlling the operating range of paravane 100a.

Wave energy converter 1000a includes slip ring 222 for mechanical, electrical, and/or data communication links to and from paravane 100a. Spindle 220 may include a pipe chase on a centerline thereof for slip ring 222 pipe, tubing and cable components.

With reference to FIG. 1, stroke telescope 206 may include a pressurized buoyancy chamber 205. As shown in FIG. 1, paravane 100a is "parked" on bolsters 224 of support structure 200a, with the PTO of energy collection device 210 retracted.

Energy Collection Device

Energy collection device 210 is operatively coupled to paravane 100a via support structure 200a. As shown in FIG. 2, energy collection device 210 is operatively coupled to stroke telescope 206, which is, in-turn, operatively coupled to paravane 100a. In operation, paravane 100a is forced upwards and downwards (relative to the energy collection device 210) in response to force applied to paravane 100a from the waves. Such upward and downward movement of paravane 100a causes stroke telescope 206 to stroke upwards and downwards along an effective stroke length, respectively, thereby, causing rod 211 of energy collection device 210 to stroke upwards and downwards within cylinder 213 of energy collection device 210, transferring water wave energy into energy collection device 210.

In a preferred embodiment, energy collection device 210 is a linear, reciprocating power take off (PTO) assembly, which may operate in a vertical alignment. As shown, energy collection device 210 includes a hydraulic cylinder (rod 211 and cylinder 213) as the PTO; however, energy collection device 210 may include other linear PTOs. The hydraulic cylinder PTO of the energy collection device 210 may be arranged such that the rod 211 of the hydraulic cylinder is arranged above the cylinder 213, as shown in FIG. 2. Such a "rod-up" configuration allows for connecting hydraulic hoses in a central position of wave energy converter 1000a, spaced-apart from moving portions of wave energy converter 1000a. This, in-turn, minimizes the required diameters of operating range telescope 204 and stroke telescope 206. Rod 211 may be mechanically coupled to a lower end of stroke telescope 206, such as via a blade mating clevis.

In a preferred embodiment, energy collection device 210 may be installed within support structure 200a. For example, energy collection device 210 may be installed solely within operating range telescope 204, with the base of cylinder 213 pinned by spherical bearing to the lower end of operating range telescope 204, and the rod 211 blade end spherical bearing pinned to the lower end of stroke telescope 206, with the lower end of stroke telescope 206 positioned within operating range telescope 204. In FIG. 1, the rod 211 blade end and pin hole center-line are not shown for purpose of clarity. Installing the energy collection device 210 within the support structure 200a protects it from the surrounding marine flora and fauna, protects it from side-loading, and allows only linear motion of the rod 211 relative to the cylinder 213, without rotary motion. However, other embodiments are envisioned in which the energy collection device 210 performs the functions of one or more of the operating range telescope 204, stroke telescope 206, and structural column 202. For example, paravane 100a may be attached to the energy collection device 210. In this arrangement, the cylinder 213 and rod 211 perform the functions of at least the stroke telescope. In another example, energy collection device 210 can also be configured to control the maximum extension or retraction of the rod 211. In this manner, the energy collection device 210 can also perform the range adjustments function.

In some embodiments, the hydraulic fluid used in one or more of the hydraulic cylinders of wave energy converter 1000a is a saturated synthetic ester-based hydraulic fluid, which provides compatibility to the marine biosphere, such as a vegetable oil-based fluid. An example of a suitable hydraulic fluid for use herein is PANOLIN® HLP SYNTH E, which meets ISO-15380 HEES, WGK-1, and OECD 301B standards. In some embodiments, wave energy converter 1000a may include sealed chambers (ecology cofferdams) external to the hydraulic cylinder pressure seals of the energy collection device 210, which may be used to monitor and control pressure seal conditions.

As harvested, ocean wave power is cyclical, based on wave period, and is delivered to an electrical power grid after conditioning (i.e., smoothing the sinusoidal surges). With linear, electrical PTO assemblies, such smoothing of sinusoidal waves may be achieved through the use of batteries, which may be environmentally hazardous, as well as financially costly. Although not shown, a preferred embodiment includes power conditioning to smooth sinusoidal waves. In one embodiment, stored pressure is used for power conditioning. The pressure may be stored hydraulically or pneumatically (e.g., stored air pressure). Technology for conditioned hydraulic power in a piston-type pressure accumulator is readily available and understood by those skilled in the art. Stored hydraulic power may then be applied to one or more electrical generators (not shown), by methods known to those skilled in the art, in a continuous and controlled manner to produce electricity. Due to continually changing ocean wave seasonal energy levels, energy collection device 210 may, at times, operate at lower than desired pressures; however, stored power allows the pressure to be increased during such times to achieve the desired pressure for hydraulic motor/generator operation.

Paravane

Figure 3:
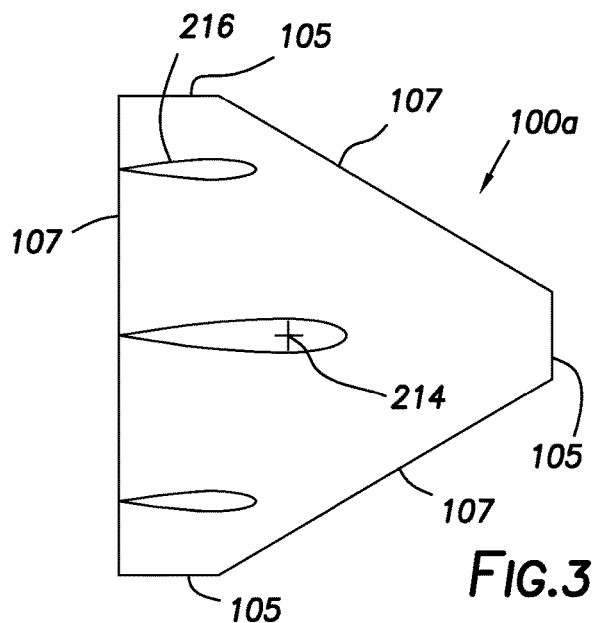
FIG. 3 is a plan view of the depth adjustable paravane of FIG. 1.
Figure 4:
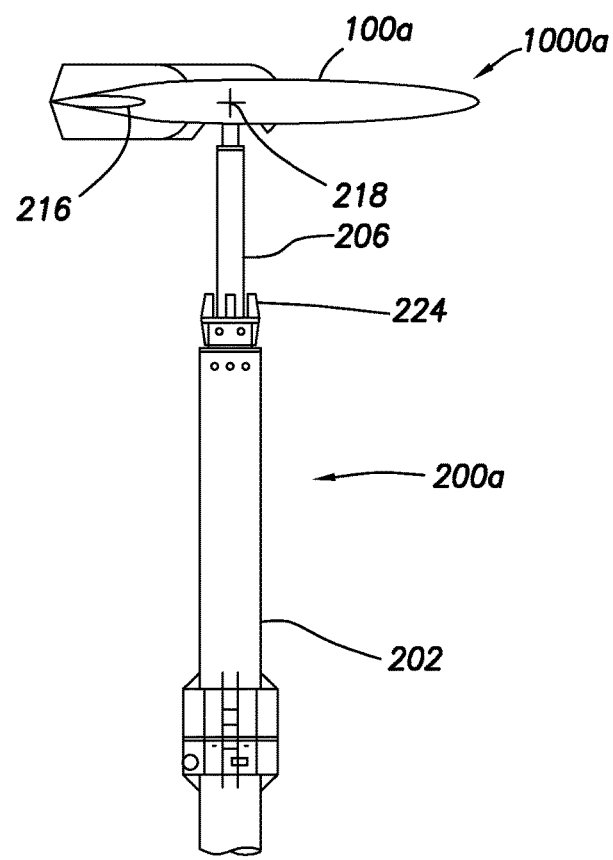
FIG. 4 is a side view of the wave energy converter of FIG. 1, with the stroke telescope extended and the operating range telescope retracted.
Figure 10:
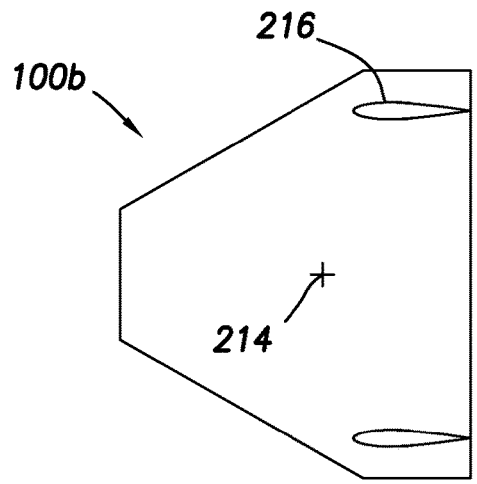
FIG. 10 is a plan view of the depth adjustable paravane of FIG. 6.
Figure 11:
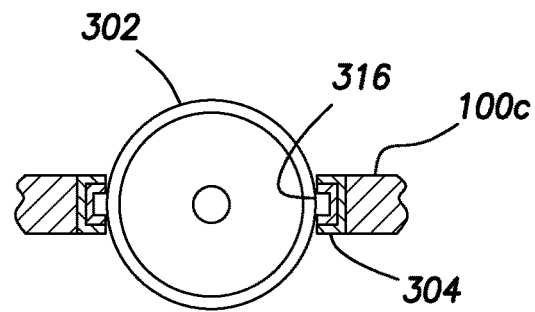
FIG. 11 is a detail view of a pitch wheel of the wave energy converter showing the roll ring and azimuth bearing chase assembly and roll ring frame in accordance with FIG. 18.
Figure 12:
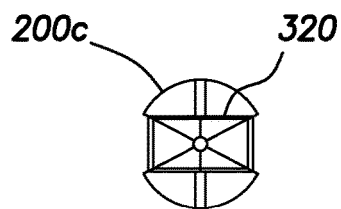
FIG. 12 is a detail view of an upper traveling spar frame of the wave energy converter of FIG. 18.
Figure 13:
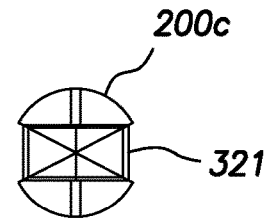
FIG. 13 is a detail view of a lower traveling spar frame of the wave energy converter of FIG. 18.
Figure 14:
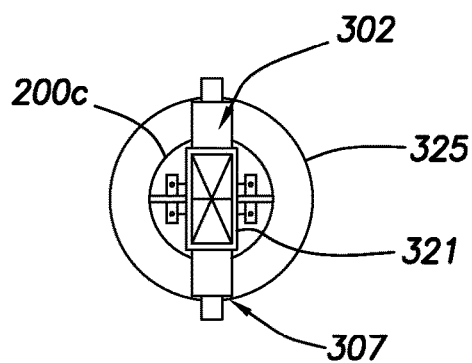
FIG. 14 is a detail, bottom view showing a sphere fairing and pitch wheel of the wave energy converter of FIG. 18.
Figure 19:
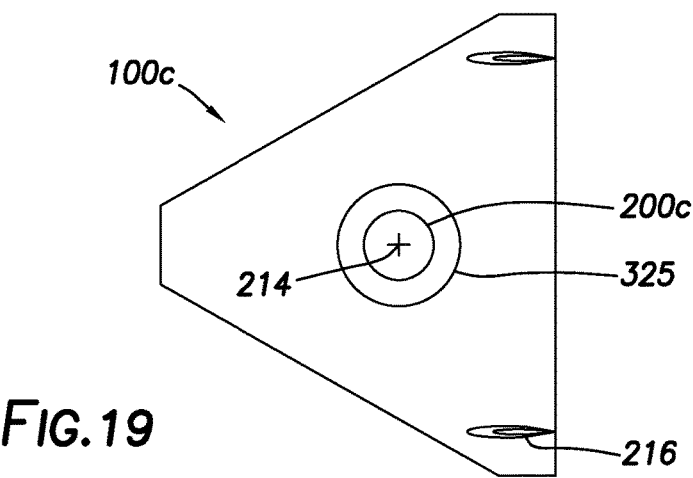
FIG. 19 is a plan view of the depth adjustable paravane of FIG. 18.

In a preferred embodiment, paravane 100a has a triangular or substantially triangular plan shape, such as an equilateral triangle plan shape. As used herein, the "plan shape" of the paravane refers to the two-dimensional shape of the paravane, and "plan shape area" or "planar area" refer to the two-dimensional area of the "plan shape." In some embodiments, the paravane has the plan shape of a truncated triangle, such as a truncated equilateral triangle. For example, paravane 100a in FIG. 3 has a plan shape of a truncated equilateral triangle. That is, if sides 107 of paravane 100a were extended to meet at points, paravane 100a would have the plan shape of an equilateral triangle. However, paravane 100a has truncated ends 105, such that paravane 100a has the plan shape of a truncated equilateral triangle. While truncated ends 105 are shown as straight sides connecting with sides 107, which are also shown as straight sides, one skilled in the art would understand that truncated ends 105 and/or sides 107 may be arcs. The truncations, forming truncated ends 105, may be equal in size, such as is with paravane 100a, or may vary, such as is with paravanes 100b and 100c (FIGS. 10 and 19, respectively). The plan shape of paravane 100a may have a symmetrical cross-section. With reference to FIG. 3, the surface area of the plan shape of paravane 100a ranges from 900 ft$^2$ to 12,000 ft$^2$, including any values there-between. As is understood by those skilled in the art, the surface area of the plan shape of paravane 100a may have any value, including those less than 900 ft$^2$ and greater than 12,000 ft$^2$. The center of planar area 214 is shown in FIG. 3. While shown and described as a "paravane", one of skill in the art would understand that the "paravane" disclosed herein is not limited to any particular shape, including those shapes conventional to paravanes. Rather, "paravane" may have any shape, size, and/or configuration suitable for the functions described herein. For example, the plan shape of the paravane may be triangular, disc, truncated triangular, or any other shape. In some embodiments, paravane 100a has a shape similar or substantially similar to a delta wing.

Paravane 100a may include at least one tail foil 216. Certain embodiments of paravane 100a include a plurality of tail foils 216. Tail foils 216 may provide at least some directional control to paravane 100a. One skilled in the art would understand that there are a number of varying ways in which to achieve rotation, pitch, and/or roll of paravane 100a in response to impact with water waves, and that the present disclosure is not limited to coupling paravane 100a to support structure 200 via a gimbal joint. In some such embodiments, both stroke telescope 206 and operating range telescope 204 are configured to retract within support structure 200a, and each of the operating range telescope 204, stroke telescope 206, and structural support 200a have no tails and/or rudders attached thereto. In some such embodiments, the connection of cables to paravane 100a and hoses to hydraulic cylinder 213 are maintained in a fixed azimuth position and do not twist within the support structure 200a. The addition of tail foils 216 to paravane 100a increases the three-dimensional surface area of paravane 100a. As such, selective placement of tail foils 216 allowed the three-dimensional surface area of paravane 100a to be increased aft of the center of planar area 214 relative to fore of the center of planar area 214.

In a preferred embodiment, a majority of the surface area of paravane 100a is aft of center of planar area 214. Such a geometrical configuration provides greater planar area friction aft than forward of paravane 100a, such that, even in non-linear and turbulent fluid vortices, paravane 100a is hydrodynamically stable. The nose or bow of paravane 100a will align to the prevailing flow, or to the resultant vector of multiple flows, via rotation of paravane 100a about support structure 200a.

In a preferred embodiment, the center of planar area 214 coincides with the center of buoyancy of paravane 100a. The center of planar area 214 and/or the center of buoyancy is, in at least some embodiments, also the point at which paravane 100a is connected to stroke telescope 206 (e.g., by way of spindle 220). The stability of paravane 100a may be adjusted based on the location of this connection point, center of planar area 214, and center of buoyancy. In the preferred embodiment, the paravane 100a is configured to be both dynamically and statically stable. However, in alternative embodiments, especially those in which the paravane 100a can be controlled, the stability can be neutral or even slightly unstable—requiring control input.

Paravane 100a may have neutral buoyancy, and react to both heave-up and heave-down wave energy. The stable, efficient, and neutral buoyant hydrodynamic form of paravane 100a allows paravane 100a to operate in vigorous and high-energy conditions. The displacement of paravane 100a may be adjusted, as required, to meet neutral buoyancy in view of attached weights of active components including, but not limited to: gimbal joint 218, spindle 220, stroke telescope 206, and PTO rod 211 and cylinder 213 (or armature if the PTO is electric). In a preferred embodiment, Paravane 100a has a symmetrical cross-section. Thus, paravane 100a is not an asymmetrical lifting foil. In a preferred embodiment, paravane 100a may be shaped according to the NACA-00415 series of foils.

In some embodiments, paravane 100a has a composite construction. For example, in one embodiment, paravane 100a may have internal longitudinals, wing spars and plan shape perimeters made of metal (e.g., steel); a polymer foam (e.g., polyurethane foam) core; skin panels of multidirectional wood veneers of metal (e.g., steel) configured to withstand expected shear loads, longitudinal and transverse loads, and to provide a puncture resistance envelope to paravane 100a; layers of fiberglass or other high-tensile cloth for seamlessness, abrasion resistance and a waterproof barrier; and lamination (e.g., vacuum bag lamination of the entire paravane 100a with an epoxy). Those skilled in the art understand that paravane 100a is not limited to such a composite construction, and may be made of any suitable material(s).

Onboard components that paravane 100a may have include, but are not limited to: one or more compressed air/sea water ballast tanks; one or more (e.g., two) ailerons adapted to provide dynamic trim compensation and potential active-controls; azimuth and attitude sensing and communication; pneumatic and/or hydraulic piping, as required; male/female mechanical coupling for connection to stroke telescope 206; or combinations thereof. In some embodiments, paravane 100a may include onboard at least one (e.g., two) closed loop pairs of hydraulic cylinders or pumps (not shown) that, through pressure regulation, act as brakes to limit pitch and roll of paravane 100a by centralizing the gimbal joint 218.

Maximum wind wave (short period) or swell (long period) energy is at the still water level (SWL), i.e., the mean sea level between waves. For maximum wave energy harvesting, depth adjustable paravane 100a is operated as close as practicable to the SWL. The ability of the depth adjustable paravane 100a to be selectively raised up into prime heave energy and lowered to depths away from overabundant heave energy (when wave energy increases) allows paravane 100a to operate in varying wave energy conditions, such that wave energy harvest may be continuous, and uninterrupted by low and high-energy events. As such, some embodiments of wave energy converter 1000a exhibit no maximum operating conditions (MOC).

The threshold operation condition for the depth adjustable paravane 100a or the hydraulic PTO of the energy collection device 210 may be at low-wave energy levels. As such, the rated operating condition (ROC) of the depth adjustable paravane 100a or the hydraulic PTO of the energy collection device 210 may have a broad spectrum, with the ability to operate at low and high pressures.

The range of motion of paravane 100a is, at least in part, determined by the rod 211 stroke length. The rod 211 stroke length may be optimized from wave height historical data for particular coastlines.

As stated, the operating range telescope 204 length defines the operating range of paravane 100a. In some embodiments, the depth of the operating range telescope is adjusted to the height of tide cycles. Operating range telescope 204 may be adjusted to increase or decrease its depth as wave heights and energy decrease or increase, such that the PTO of the energy collection device 210 may continuously or continually operate at the optimal ROC. In operation, the depth of operating range telescope 204 may be controlled by power train 227, and the depth may be locked by the wedge chocks 251 engaged with guide bar/racks 217.

In some embodiments, paravane 100a may be autonomously stable and self-tending, requiring no external control. Hydraulic power logic, aided by process logic control, may be used to automate the adjustment and locking of operating range telescope 204. Hydraulic power logic may also provide for primary automated control for the energy collection device 210 PTO's: operating pressures; routing control of operating pressures distribution to storage/conditioning; and end of stroke limits.

In operation, paravane 100a functions as a wave energy mechanical interface. When paravane 100a is horizontally positioned and vertically supported at its center of planar area 214, paravane 100a will transmit applied vertical forces aligned to the vertical support centerline that contains the energy collection device 210 PTO assembly. Paravane 100a transmits harvested wave energy to energy collection device 210.

In the embodiment shown in FIGS. 1-4, the depth adjustable paravane 100a is installed on single, structural column 202. The depth adjustable paravane 100a of FIGS. 1-4 is omni-directional, including rotation about support structure 200a, as well as pitch and roll. As such, depth adjustable paravane 100a is configured to harvest singular or multiple wave swell energy, as well as sea heave energy. In operation, the depth adjustable paravane 100a aligns with a resultant vector of all impacting wave velocities and ocean currents, providing the least hydrodynamic drag to the structural column 202. Paravane 100a extends or retracts to operate in the optimum wave energy range. The embodiment of wave energy converter 1000a shown in FIGS. 1-4 may shed over-abundant wave energy by operating at lower hydraulic cylinder pressures. While operating at lower hydraulic cylinder pressures, average stroke and hydraulic volume increase, such that energy production is continuous.

Surge-Sway Tower

FIGS. 5-10 depict wave energy converter 1000b, and portions thereof, in accordance with certain embodiments of the present disclosure. In FIGS. 5-10, like reference numerals relative to those in FIGS. 1-4 are used to indicate like elements.

Wave energy converter 1000b operates in substantially the same manner as wave energy converter 1000a, with the exception that the first section, structural column 202, of FIGS. 1-4 is replaced with a first section that is a surge-sway tower 202b. In some embodiments, surge-sway tower 202b is an extension of structural tower 202, and coupled therewith.

Surge-sway tower 202b of support structure 200b is an omni-directional cantilever that is operatively coupled to pedestal frame 228. Pedestal frame 228 is fixed relative to the seabed 234, and surge-sway tower 202b is configured to move relative to the seabed 234. As shown, surge-sway tower 202b is operatively coupled to pedestal frame 228 via pivot double gimbal 218a along a midsection of surge-sway tower 202b. Surge-sway tower 202b is also operatively coupled to pedestal frame 228 via hydraulic cylinder 232 and universal joint 230 at a bottom end of surge-sway tower 202b. Hydraulic cylinder 232 may be within a splined cylinder carrier. Hydraulic cylinder 232 is coupled to double gimbal 218b, and double gimbal 218b is coupled to pedestal frame 228. Gimbals 218a and 218b may be the same as or substantially similar gimbal 218, as described with respect to FIGS. 1-4

Surge-sway tower 202b is configured to absorb wave-surge energy from any direction. Thus, wave energy converter 1000b is configured to harvest both wave heave and surge energy. In operation, the upper portion of surge-sway tower 202b, above gimbal 218a, reacts to prime, omni-directional wave surge energy, and the lower portion of surge-sway tower 202b, below gimbal 218a, operates in diminished wave energy surge.

In some embodiments, surge-sway tower 202b has about a 2:1 mechanical advantage to the hydraulic cylinder 232 PTO. When surge-sway tower 202b is initially, minimally out of alignment with hydraulic cylinder 232, surge-sway tower 202b may have a mechanical advantage to the hydraulic cylinder 232 PTO that is, at least theoretically, infinite. The actual mechanical advantage diminishes as the angular misalignment increases. Surge-sway tower 202b may shed over-abundant surge energy by operating at lower hydraulic cylinder pressures, allowing greater sway and presenting less surface area to the impacting surge energy. While operating a lower pressure, hydraulic volume increases such that energy production may be continuous.

Self-tending fairings 226, as shown in FIG. 5, may be coupled with surge-sway tower 202b depending upon local conditions, such as if coastwise currents are a detriment to surge energy harvest. Such self-tending fairings 226 may reduce added hydraulic mass, thereby, changing surge energy absorption by reducing inertia. Self-tending fairings 226 may cover structural column 202 or surge-sway tower 202b, for example. Self-tending fairings 226 may be adapted to rotate about structural column 202 or surge-sway tower 202b, when coupled therewith. In some embodiments, self-tending fairings 226 do not cover stroke telescope 206 or operating range telescope 204. Self-tending fairings 226 may also be used, in some embodiments, to assist in the directional control of paravane 100b. In some such embodiments, structural column 202 is configured to rotate with paravane 100b.

Figure 7:
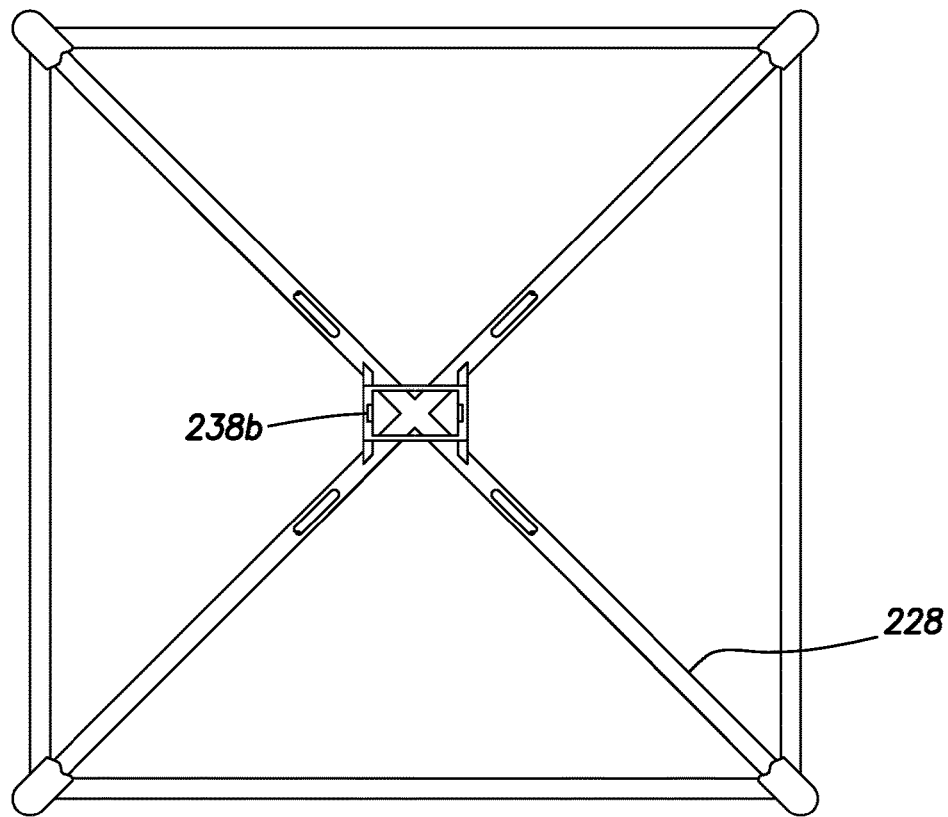
FIG. 7 is a detail view showing bolster keyways along line 7-7 of FIG. 6.
Figure 8A:
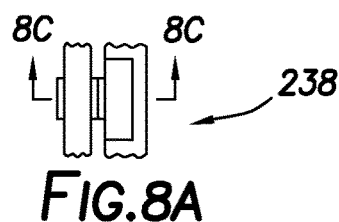
FIG. 8A is a detail, side view of a double-keyway axle bolster.
Figure 8B:
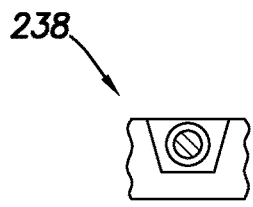
FIG. 8B is a detail, front view of the double-keyway axle bolster of FIG. 8A.
Figure 8C:
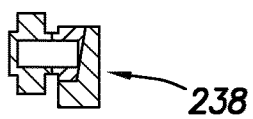
FIG. 8C is a view along line 8C-8C of FIG. 8A.
Figure 9:
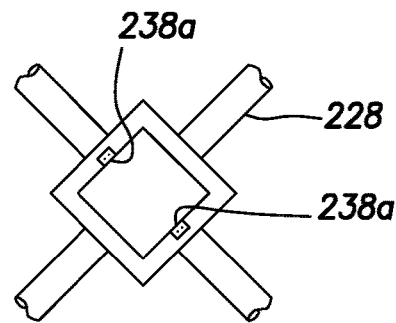
FIG. 9 is a detail view of bolster keyways along line 9-9 of FIG. 6.

Assemblies of axles' bolsters two key ways 238a and 238b are shown for gimbals 218a and 218b in FIGS. 7 and 9, respectively. The non-locking taper of these double key ways 238a and 238b allow ease of removal and an integral 'stabbing guide' for re-installation. FIGS. 8A-8C show one embodiment of the axle bolsters of FIGS. 7 and 9.

In some embodiments of surge-sway tower 202b, air buoyancy tank displacement may be used. For example, wave energy converter 1000b, which, as shown, is designed for an ocean depth of 300 feet, may employ air buoyancy tank displacement at depths from 132 feet to 250 feet. Such air buoyancy tank displacement may be used to: reduce the negative impact of 'wet tank' inertia on wave energy harvest; mitigate weight during installation and retrieval operations; or combinations thereof. While wave energy converter 1000b of FIGS. 5-10 is designed for an ocean depth of 300 feet, those skilled in the art understand that embodiments of such a wave energy converter may be scaled up or down for different ocean depths, as local conditions require.

The paravane 100b of FIG. 10 is similar to the paravane 100a of FIG. 3, but does not include the center tail foil.

Guide Spar

FIGS. 11-20 depict wave energy converter 1000c, and portions thereof, in accordance with certain embodiments of the present disclosure. In FIGS. 11-20, like reference numerals relative to those in FIGS. 1-4 and FIGS. 5-10 are used to indicate like elements.

While paravane 100c of wave energy converter 1000c is similar to paravane 100a and 100b, it is supported on support structure that is or includes guide spar 200c. In one embodiment, guide spar 200c is a portion of a "moored floating structure" or a "fixed offshore platform" 300. Paravane 100c is configured to have the same or similar range of motion as paravane 100a, including a full 360 degree of rotation about support structure 200c and an up to 40 degree pitch and roll. However, in wave energy converter 1000c, hydraulic PTO components of energy collection device 210a are disposed onboard the moored floating structure or fixed offshore platform, and not located subsea, thereby, easing maintenance activities for energy collection device 210a. Paravane 100c may be hauled up, out of the ocean, to an elevation where maintenance may be performed.

The plan area of paravane 100c is a slightly different shape relative to paravanes 100a and 100c. The slight difference is the result of a smaller piece off being truncated off the front than either of the sides.

Wave energy converter 1000c is configured to harvest wave heavy up and wave heave down energy, due, at least in part, to the neutral buoyancy of paravane 100c and all active components of wave energy converter 1000c. Wave energy converter 1000c exhibits at least three operational distinctions relative to wave energy converters 1000a and 1000b, including: (1) all hydraulic PTO components of energy collection device 210a and their control system(s) are disposed in a controlled atmosphere environment above sea level; (2) paravane 100c may be lowered to greater depths than paravanes 100a and 100b, at least in part, because paravane 100c depth controls are not disposed beneath paravane 100c; and (3) minimal or no maintenance vessels or subsea operations are required due to the positioning of equipment.

The up to 40° pitch and roll of paravane 100c is accomplished via pitch wheel 302 and roll ring and azimuth bearing chase assembly 304. Pitch wheel 302 is aligned with the fore and aft centerline of paravane 100c, and includes two roll ring axles 306 and roll ring axel sluice 307. Pitch wheel 302 is centralized by pitch wheel bearing chase and carriage frame 308 within guide spar 200c. In operation, pitch wheel yoke 310 supports roll ring axles 306, and transmits heave forces to the hydraulic PTO of energy collection device 210a via actuator rod 312, which couples with cylinders of energy collection device 210a via actuator rod locking collet 314. While not shown in FIGS. 11-20, wave energy converter 1000c may include elevation controls to control actuator rod 312, thereby, determining the operating range of paravane 100c. In some embodiments, elevation control of actuator rod 312 is the same as or similar to continuous loop chains 323, with pitch wheel bearing chase and carriage frame 308, sphere fairing 325, and paravane 100c selectively decouplable from the loop chains to allow wave energy harvesting. Similar to the operation of wave energy converters 1000a and 1000b, the operating range is determined by the stroke length of actuator rod 312 and associated hydraulic cylinders. Increasing the draft of the operating range reduces exposure of paravane 100c to wave energy.

Roll ring and azimuth bearing chase assembly 304 includes roll ring frame 316, which couples to the two roll ring axles 306. Azimuth bearing chase of roll ring and azimuth bearing chase assembly 304 is coupled (e.g., fastened) to the structural frame of paravane 100c. In operation, horizontal loads are transmitted from the roll ring and azimuth bearing chase assembly 304 to roll ring frame 316 via roller bearings. Vertical heave loads up and down via double thrust bearings within roll ring and azimuth bearing chase assembly 304.

Mechanical power transmission to the PTO of energy collection device 210a is achieved via actuator rod 312, which may be constructed of steel pipe, for example. Guide spar 200c, and upper traveling spar frames 320 of guide spar 200c, support the reciprocating action of the actuator rod 312.

Two halves of guide spar 200c are defined by the centerline guide spar sluice 322. Sluice 322 is a gateway that provides structural tracks for pitch wheel 302 pitch wheel bearing chase and carriage frame 308. The structural tracks of sluice 322 are also operatively engaged by upper traveling spar frames 320, lower traveling spar frame 321, and sluice 322 gates. Pitch wheel bearing chase and carriage frame 308, upper traveling spar frames 320, lower traveling spar frame 321, and sluice 322 gates tie the two halves of the guide spar 200c together to form a singular column structure. Section 301 is open to the sea, and the vertical height thereof matches the stroke length of hydraulic cylinders 303. As shown, each of the twelve hydraulic cylinders 303 of energy collection device 210b are extended, and paravane 100c is at apogee.

In operation, the optimum orientation of sluice 322 in guide spar 200c to the local spectrum of wave energies may be determined. The alignment of the bow of paravane 100c and sluice 322 is not necessarily indicative of the optimum orientation of sluice 322 in guide spar 200c. The orientation of the bow of paravane 100c to sluice 322 determines the naming convention such that, if the orientation is rotated by 90°, pitch wheel 302 becomes a roll wheel; and the roll ring of roll ring and azimuth bearing chase assembly 304 becomes a pitch ring. Regardless of name, pitch wheel 302 and roll ring of roll ring and azimuth bearing chase assembly 304 jointly and alternately provide pitch and roll capabilities to paravane 100c.

The deployment and elevation of the upper traveling spar frames 320, lower traveling spar frames 321, and sluice 322 gates is controlled by continuous loop chains 323 coupled therewith, which provide simultaneous down-haul and up-haul.

Figure 20:
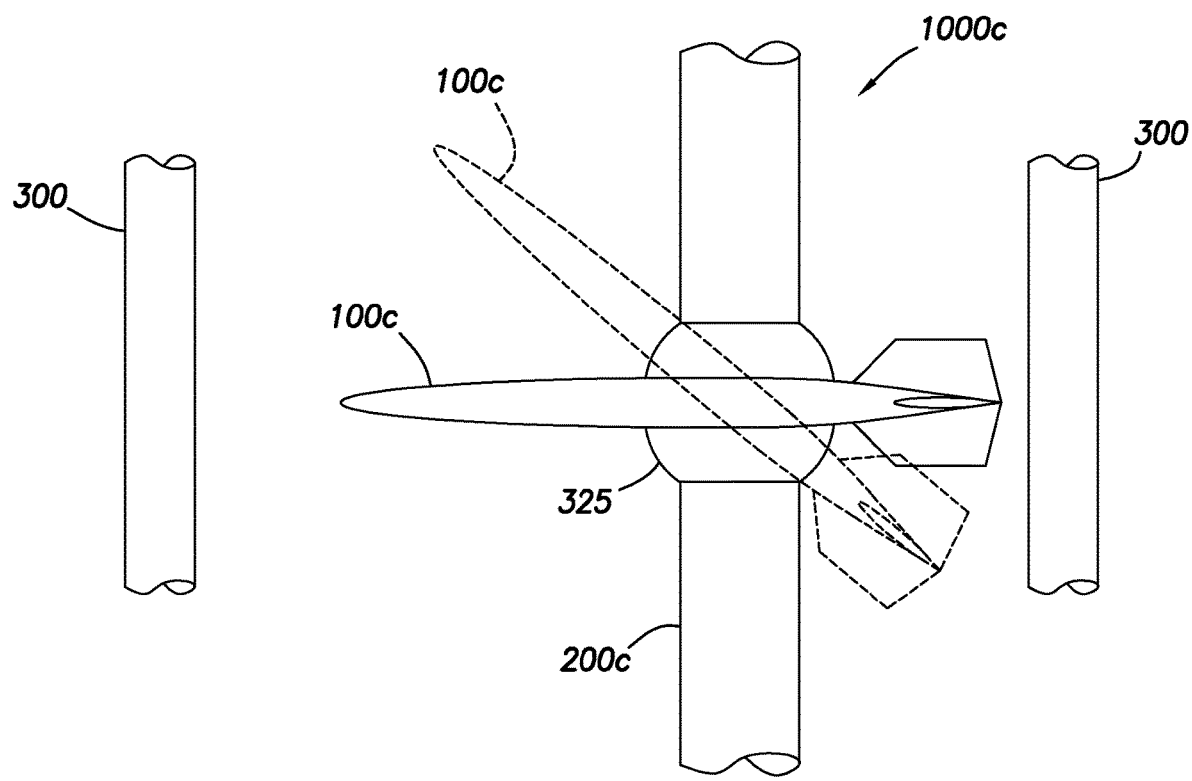
FIG. 20 is a port elevation view of a portion of the wave energy converter of FIG. 18, showing that 40° of pitch and 40° of roll is achieved by the pitch wheel and roll ring assembly.

Pitch wheel bearing chase and carriage frame 308 supports sphere fairing 325. In operation, pitch wheel bearing chase and carriage frame 308, sphere fairing 325, and paravane 100c reciprocate together in response to wave energy heave. In FIG. 20, the solid line paravane 100c is shown disposed at a 0 degree pitch, and the dashed line paravane 100c is shown disposed at a 40-degree pitch.

Attributes of Depth Adjustable Paravane and Power Take Off Arrangements

In certain embodiments, the depth adjustable paravanes 100a-100c and PTO arrangements of the energy collection devices 210, 210a are characterized by one or more of the following attributes: (1) minimization of weight and horizontal load on supporting structures 200a-200c due, at least in part, to neutral buoyancy and the hydrodynamic form plan shape of paravanes 100a-100c; (2) optimum vertical alignment to the PTO assembly(s) of energy collection devices 210, 210a; (3) the neutral buoyant mechanical interfaces of paravanes 100a-100c reacting equally to wave heave down and wave heave-up, allowing greater utilization of double-acting PTO assembly(s); (4) the ability to operate efficiently in vigorous, high-energy wave conditions due, at least in part, to the stable hydrodynamic form of paravanes 100a-100c; and (5) the ability to retract from increasing wave energy near the surface by increasing depth, thereby, allowing for continued energy harvesting at ideal, design optimized energy levels without shutting-down and entering into a "survival mode".

Neutral Buoyancy

The mechanical interface active components (i.e., components that react to heave motion) of wave energy converters 1000a-1000c may include, but are not necessarily limited to: paravanes 100a-100c; double gimbal 218; spindle 220; rod 211; cylinder 213; and the stroke telescope 206. In a preferred embodiment, the displacement (volume) of paravanes 100a-100c is configured to net neutral buoyancy of the total weight of all active components, including the structural weight of the paravane. Neutral buoyancy allows for greater utilization of a double-acting PTO of the energy collection device to both wave heave up and wave heave down, equally. In contrast, buoy type WECs are only configured to drive cylinder in one direction, consuming harvested power to return the cylinder in the opposite direction. Neutral buoyancy of the paravanes disclosed herein reduces or eliminate side loading on the wave energy converters, such as side loading on the support structures thereof. As such, the neutrally buoyant paravanes may only or substantially only react to heave up and heave down forces.

Method of Harvesting Water Wave Energy

Certain embodiments of the present disclosure provide for a method of harvesting water wave energy. The method may be implemented using a wave energy converter as described herein, such as any of wave energy converters 1000a-1000c.

The method includes positioning a paravane within water to be impacted by water waves. For example, the paravane may be positioned close to SWL, such that at least some wave mass and/or water particles in motion are positioned above the paravane to provide 'heave down' forces on the paravane. Impact of the paravane by water waves transfers water wave energy to the paravane.

The method includes transferring water wave energy from the paravane to the energy collection device. For example, in response to impact with water waves, the paravane moves. Movement of the paravane may, in-turn, transfer energy to the energy collection device, such as via extension and retraction of the stroke telescope or actuator rod coupled to the energy collection device.

The method may include storing the transferred wave energy in the energy collection device. For example and without limitation, the energy may be stored as hydraulic energy, pneumatic energy, electrical energy, or combinations thereof.

The method may include raising or lowering the paravane relative to a mean sea level. For example and without limitation, the depth of the paravane relative to the mean sea level may adjusted in response to changes in the mean sea level, changes in the force of impact imparted from the water waves to the paravane, changes in a desired level of energy to be harvested from the water waves, or combinations thereof. In embodiments in which wave energy converter 1000a or 1000b is used in the method, raising the paravane includes extending the operating range telescope, and lowering the paravane includes retracting the operating range telescope.

In the method, the paravane self-aligns with the prevailing flow, or to the resultant vector of multiple flows, of water. Alignment of the paravane with the water flow is achieved via rotation of the paravane about the support structure, e.g., a gimbal joint 218.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wave energy converter comprising:
   a support structure;
   a depth adjustable paravane rotationally and pivotably coupled to the support structure, wherein said paravane has neutral buoyancy; and
   an energy collection device coupled to the paravane;
   wherein the paravane applies downward force on said energy collection device in response to downward force applied to the paravane by heave-down waves;
   wherein the paravane has a plan shape having a surface area and a center of planar area, wherein a majority of said surface area is aft of the center of planar area, and wherein the paravane includes at least one tail foil; and
   wherein the paravane has a bow that is fore of the center of planar area, and wherein the paravane is shaped so that hydraulic force from a water flow biases the bow into alignment with a prevailing water flow.

2. The wave energy converter of claim 1, wherein said support structure comprises:
   a first section;
   a second section telescopically engaged to said first section; and
   a third section telescopically engaged to said second section.

3. The wave energy converter of claim 2, wherein said first section is fixed relative to the seabed, said second section is extendable relative to the first section, and said third section is extendable relative to said second section.

4. The wave energy converter of claim 3, wherein the first section is a static structural column, the second section is an operating range telescope extendable and retractable to define an operating range of the paravane, and the third section is a stroke telescope extendable and retractable in response to impact with water waves.

5. The wave energy converter of claim 2, wherein said first section is an omni-directional cantilever coupled to a pedestal frame, wherein the pedestal frame is fixed relative to a seabed, wherein said second section is movable relative to the seabed, and wherein said third section is coupled to the paravane.

6. The wave energy converter of claim 5, wherein said support structure is configured to absorb wave-surge energy from any direction, and wherein the wave energy converter is configured to harvest both wave heave and surge energy.

7. The wave energy converter of claim 5, wherein said omni-directional cantilever is coupled to the pedestal frame via a first gimbal along a midsection of the first section and via a hydraulic cylinder at a bottom end of the first section, the hydraulic cylinder coupled to a second gimbal, the second gimbal coupled to the pedestal frame.

8. The wave energy converter of claim 1, characterized in that movement of the paravane includes rotation, pitch and roll relative to the support structure.

9. The wave energy converter of claim 8, characterized in that movement of the paravane includes 360° of rotation about the support structure and up to 40° pitch and roll relative to the support structure.

10. The wave energy converter of claim 1, wherein the support structure comprises a static structural column, an operating range telescope extendable and retractable relative to the static structural column to adjust the depth of the paravane and define an operating range of the paravane, and a stroke telescope coupled to the paravane and extendable and retractable in response to impact with water waves impacting the paravane, wherein the stroke telescope is coupled to the energy collection device.

11. The wave energy converter of claim 10, wherein the operating range telescope includes guide bar/racks configured to limit rotation of the operating range telescope, wherein the guide bar/racks are engaged with draft locking assemblies and draft adjustment assemblies.

12. The wave energy converter of claim 10, wherein the paravane is rotationally and pivotably coupled to a top of the stroke telescope via a gimbal joint.

13. The wave energy converter of claim 1, the energy collection device includes a linear, reciprocating power take off (PTO) assembly.

14. The wave energy converter of claim 1, wherein the paravane is configured to align with the prevailing flow, or to the resultant vector of multiple flows, of water via rotation of the paravane about the support structure.

15. The wave energy converter of claim 1, wherein said support structure includes a guide spar.

16. The wave energy converter of claim 15, wherein the guide spar is a portion of a fixed offshore platform.

17. The wave energy converter of claim 16, wherein the energy collection device is disposed onboard the offshore platform and above sea level.

18. The wave energy converter of claim 1, wherein the paravane is a wave energy mechanical interface that is reactive to both wave heave-up forces and wave heave-down forces, characterized in that the paravane is forced upwards in response to upward force applied to the paravane by heave-up waves and is forced downwards in response to downward force applied to the paravane by heave-down waves, and further characterized in that water wave energy is transferred from the paravane to the energy collection device in response to both heave-up and heave-down waves.

19. The wave energy converter of claim 1, wherein the paravane is coupled with the support structure via a double gimbal.

20. A wave energy converter comprising:
a depth adjustable paravane rotationally and pivotably coupled to a support structure, wherein the support structure comprises a static structural column, an operating range telescope extendable and retractable relative to the static structural column to adjust the depth of the paravane and define an operating range of the paravane, and a stroke telescope coupled to the paravane and extendable and retractable in response to impact with water waves impacting the paravane; and
an energy collection device coupled to the paravane and to the stroke telescope;
wherein the paravane is rotationally and pivotably coupled to a top of the stroke telescope via a gimbal joint, and wherein the gimbal joint includes a double gimbal and a spindle, wherein the spindle is coupled to the stroke telescope, and wherein both the spindle and the stroke telescope are configured to not rotate in response to paravane azimuth change.

21. A method of harvesting water wave energy, the method comprising:
positioning a paravane within water to be impacted by water waves, the paravane rotationally and pivotably coupled to a support structure, wherein said paravane has neutral buoyancy, and wherein the paravane is coupled to an energy collection device, wherein impact of the paravane by water waves transfers water wave energy to the paravane; and
transferring water wave energy from the paravane to the energy collection device;
wherein the paravane applies downward force on said energy collection device in response to downward force applied to the paravane by heave-down waves;
wherein the paravane has a plan shape having a surface area and a center of planar area, wherein a majority of said surface area is aft of the center of planar area, and wherein the paravane includes at least one tail foil; and
wherein the paravane has a bow that is fore of the center of planar area, and wherein the paravane is shaped so that hydraulic force from a water flow biases the bow into alignment with a prevailing water flow.

22. The method of claim 21, further comprising raising or lowering the paravane relative to a mean sea level.

23. The method of claim 22, further comprising, after raising or lowering the paravane relative to the mean sea level, locking a position of the paravane.

24. The method of claim 21, wherein the paravane applies upward force on said energy collection device in response to upward force applied to the paravane by heave-up waves.

25. The method of claim 21, wherein the paravane is positioned within the water such that at least some water mass is positioned above the paravane to provide heave-down force on the paravane, and wherein the paravane is a wave energy mechanical interface that reacts to both wave heave-up forces and wave heave-down forces, such that the paravane is forced upwards in response to upward force applied to the paravane by heave-up waves and the paravane is forced downwards in response to downward force applied to the paravane by heave-down waves, and wherein water wave energy is transferred from the paravane to the energy collection device in response to both wave heave-up forces and wave heave-down waves.

26. A wave energy converter comprising:
a support structure comprising a guide spar;
a paravane rotationally and pivotably coupled to the support structure; and
an energy collection device coupled to the paravane;
characterized in that the paravane applies downward force on said energy collection device in response to downward force applied to the paravane by heave-down waves; and wherein the paravane is coupled to the guide spar via a pitch wheel and roll ring and azimuth bearing chase assembly.

27. A wave energy converter comprising:

a support structure;

a depth adjustable paravane rotationally and pivotably coupled to the support structure, wherein said paravane has neutral buoyancy, and wherein the paravane has a triangular plan shape and includes at least one tail foil; and an energy collection device coupled to the paravane;

wherein the paravane applies downward force on said energy collection device in response to downward force applied to the paravane by heave-down waves.

28. The wave energy converter of claim 27, wherein the paravane has an equilateral triangle plan shape.

29. The wave energy converter of claim 27, wherein the paravane has a truncated triangle plan shape.

30. The wave energy converter of claim 27, wherein the at least one tail foil is positioned aft of a center of planar area.

* * * * *